United States Patent [19]
Sullivan

[11] Patent Number: 4,708,536
[45] Date of Patent: Nov. 24, 1987

[54] EXPANDABLE WEDGE ASSEMBLY FOR RELEASABLY SECURING AN INSERT IN A CUTTING TOOL

[75] Inventor: Jack O. Sullivan, Knoxville, Tenn.

[73] Assignee: General Electric Company, Detroit, Mich.

[21] Appl. No.: 930,080

[22] Filed: Nov. 12, 1986

Related U.S. Application Data

[63] Continuation of Ser. No. 689,383, Jan. 7, 1985, abandoned.

[51] Int. Cl.⁴ .............................................. B23C 5/22
[52] U.S. Cl. ...................................... 407/41; 407/49; 407/50
[58] Field of Search .................... 407/41, 49, 50, 40, 407/91, 94, 108, 109; 144/230

[56] References Cited

U.S. PATENT DOCUMENTS

| | | | |
|---|---|---|---|
| 1,049,589 | 1/1913 | Mitchell | 144/230 |
| 3,058,198 | 10/1962 | Williams | 407/49 |
| 3,270,396 | 9/1966 | Williams | 407/50 |
| 3,299,491 | 1/1967 | Hall | |
| 3,624,879 | 12/1971 | Ayer | |
| 3,660,879 | 5/1972 | Erkfritz | |
| 4,292,866 | 10/1981 | Kaczynski | 407/109 |

FOREIGN PATENT DOCUMENTS

685447  9/1979  U.S.S.R. ................................ 407/50

*Primary Examiner*—Nicholas P. Godici
*Assistant Examiner*—Jerry Kearns
*Attorney, Agent, or Firm*—Hedman, Gibson, Costigan & Hoare

[57] ABSTRACT

An expandable wedge assembly which releasably secures a cutting blade or wafer like indexable insert in a pocket of a cutting tool. The wedge assembly includes flexible legs which expand or flex outwardly to secure the insert against a wall of the pocket and which unexpand or unflex to release the insert for indexing or replacement. Preferably, a screw and ball means movable in a bore in the wedge effect the flexing and unflexing of the wedge. A locater assembly for positioning the insert in the pocket also can be provided. Preferably, the structure and operation of the locator is similar to the structure and operation of the wedge.

6 Claims, 6 Drawing Figures

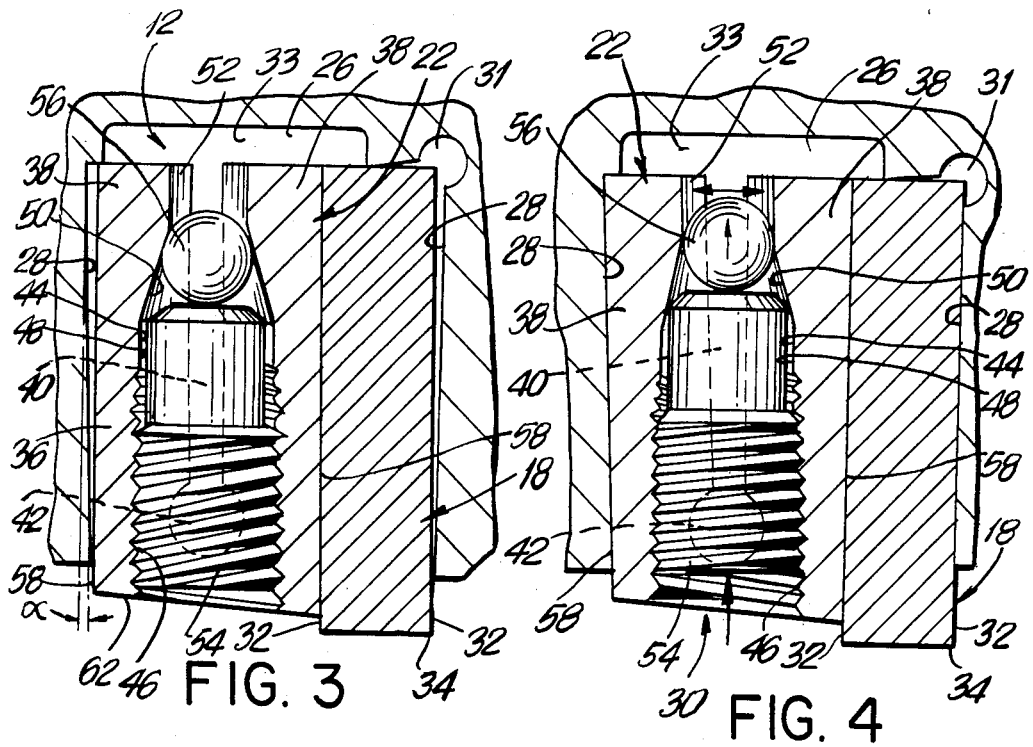
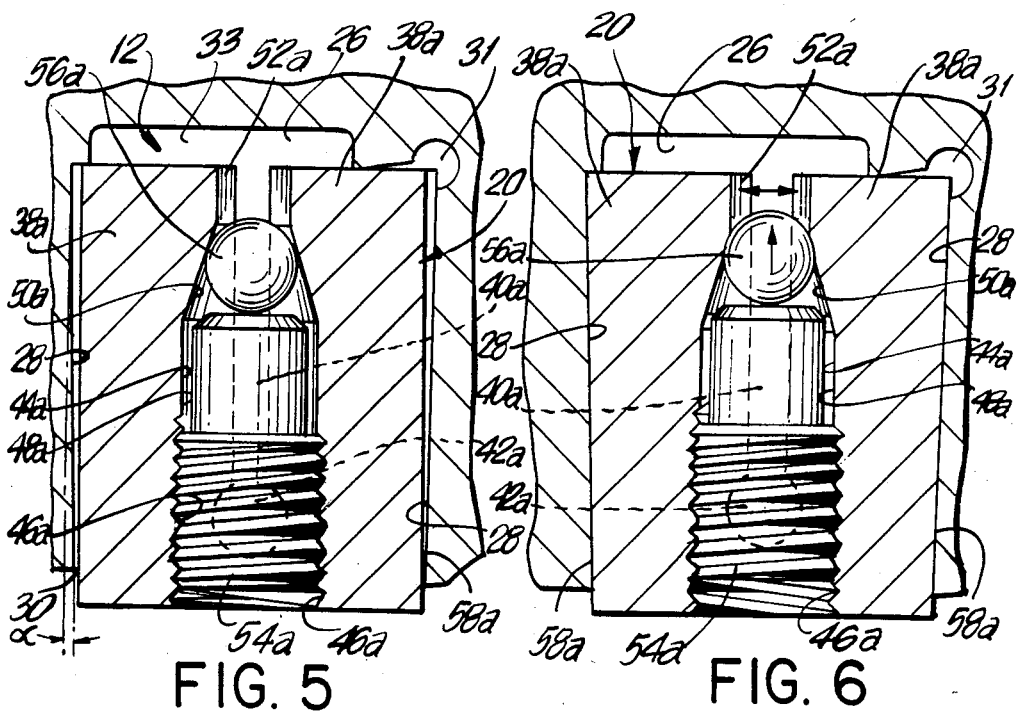

EXPANDABLE WEDGE ASSEMBLY FOR RELEASABLY SECURING AN INSERT IN A CUTTING TOOL

This is a continuation of Ser. No. 689,383 filed Jan. 7, 1985 and now abandoned.

BACKGROUND OF THE INVENTION

This invention relates to an expandable wedge assembly for releasably securing an indexable and replaceable insert in a cutting tool, and more particularly to an expandable wedge assembly for securing a blade or wafer like insert in a pocket of the cutting tool.

The use of replaceable and indexable inserts, in the form of cutting blades or wafers held in a pocket or cavity of a cutting tool, is well known. Generally, the inserts are held in the cutting tools by screws, clamps, wedges, or some combination of the foregoing. However, each presently available system has drawbacks. For example, a screw normally requires a threaded hole in the body of the cutting tool to secure the blade or wafer thereto. In the event of damage or a wreck during use, the screw and body can be damaged making repair and replacement difficult. When wedges are used, the walls of the pocket may include screw holes or one or more angles which cooperate with screws or with corresponding angles on the wedges to secure the inserts in place. As a consequence, heretofore available wedge systems required special machining, adding to the costs of the cutting tool. See, for example, U.S. Pat. Nos. 3,624,879 and 3,660,879.

Thus, there is a need for an insert holding assembly which will limit damage to the cutting tool, which readily can be replaced and which will not substantially increase the cost of the cutting tool.

SUMMARY OF THE INVENTION

In accordance with the present invention, there is provided an expandable wedge assembly which releasably secures a blade or wafer like insert in a pocket of a cutting tool. Upon expansion, the wedge locks the insert against a wall of the pocket and upon contraction, the insert is released for indexing and replacement. The wedge assembly of the invention includes a wedge having a base and a pair of flexible legs extending therefrom which flex outwardly, and means which extend through the base and between the legs for flexing and unflexing thereof.

In a preferred embodiment, the outer portion of the wedge is the base and the inner portion of the wedge includes a vertical slot therethrough to form the legs. Extending through the wedge in a direction horizontal thereto is a bore having an outer threaded portion and a tapered inner portion. A screw is provided in the threaded portion of the bore and an expanding means is provided in the tapered portion of the hole. The screw is adapted to cooperate with the expanding means so that as the screw is threaded into the wedge, the expanding means is driven further into the tapered portion of the bore to urge or flex the legs of the wedge laterally apart. Correspondingly, as the screw is threaded from the wedge, the expanding means is free to return to the larger section of the tapered portion, and thereby cause the legs to unflex.

The cutting tool, which utilizes the present invention, can be provided with one or more slots or pockets, each of which has an inner wall, a pair of opposing side walls and an outer opening which is opposite to and coextensive in length with the inner wall. The cutting blade preferably is in the form of a wafer having opposing sides and a plurality of cutting edges about its periphery. The blade is inserted in the pocket with one of its sides adapted to be held against a side wall of the pocket by the action of the expandable wedge of the present invention which is positioned between the opposing side wall of the pocket and the opposite side of the insert. When the legs of the wedge are flexed outwardly by the action of the screw and expanding means, the insert is locked between the wedge and the side wall of the pocket. When the flexed legs are released by the screw and expanding means, the legs are unflexed, allowing the cutting blade to be indexed or replaced.

Thus, the expandable wedge and cutting tool assembly of the present invention overcomes the drawbacks of the heretofore available systems for securing a blade or wafer like insert in a cutting tool. The present invention limits possible damage to the cutting tool because it does not extend through the walls of the cutting tool to secure the insert. The present invention readily can be replaced because of its relatively simple structure. The present invention does not increase cutting tool costs because it does not require the walls of the pockets to have any special configuration for cooperation with the wedge assembly to hold an insert.

The assembly of the present invention also can include a locator for the insert. Preferably, the locator is expandable, has features similar to the expandable wedge of the invention, and has a surface upon which the insert and expandable wedge can rest. The locator of the invention is movable within the pocket of the cutting tool for positioning of the insert for cutting.

BRIEF DESCRIPTION OF THE DRAWINGS AND DETAILED DESCRIPTION OF THE INVENTION

The following is a detailed description together with the accompanying drawings of an illustrative embodiment of the invention. It is to be understood that the invention is capable of modification and variation apparent to those skilled in the art within the spirit and scope of the invention.

FIG. 3 is a sectional view, taken along lines 3—3 of FIG. 1, illustrating positioning of the wedge assembly and insert in the pocket of the cutting tool prior to flexing of the legs of the wedge.

FIG. 4 is the same sectional view as FIG. 3, illustrating the flexing of the legs of the wedge to lock the insert in place.

FIG. 5 is a sectional view, taken along the lines 5—5 of FIG. 1, illustrating the positioning of the locator of the present invention in the pocket of the cutting tool prior to being locked in place.

FIG. 6 is the same sectional view of FIG. 5, illustrating the flexing of the legs of the locator to lock the locator in position.

Figure 1:
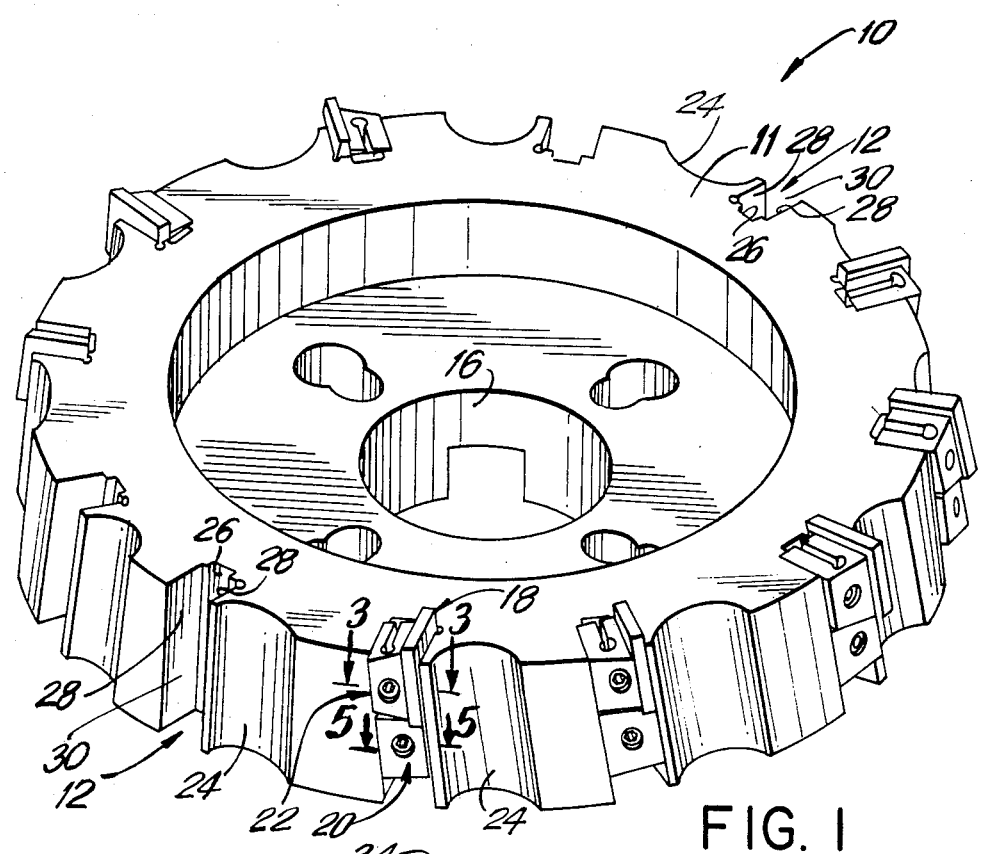
FIG. 1 is a perspective view of a face milling cutter employing a preferred embodiment of the wedge and locator assembly of the present invention.

Referring to the drawings and first to FIG. 1, there is shown a cutting tool 10 particularly suited for the present invention. The tool 10 is a face milling cutter, and includes an annular body 11, a plurality of slots or pockets 12 radially spaced about the periphery of the body 11, and a central opening 16 therethrough for receiving a spindle (not shown) adapted to be keyed thereto for rotation of the milling cutter.

Within each pocket 12, is an indexable and replaceable cutting insert 18, a laterally expandable locator 20 for positioning the insert 18 in the pocket 12, and a laterally expandable wedge 22 for releasably securing the insert 18 therein. Adjacent each pocket 12 is a groove 24 which facilitates removal of the metal cut by the inserts 18.

Each slot or pocket 12 includes an inner wall 26, opposing side walls 28 and an opening 30 at its outer periphery. The walls 26, 28 and the opening 30 essentially are vertical and are coextensive with the height of the ring body 11.

In addition, the opposing side walls 28 preferably are dovetailed slightly inward so as to be closer together at the outer opening 30 than at the base or inner wall 26 of the pocket 12. The angle can be from about 0° to about 3°, and preferably from about 0.75° to 1.5°. As shown in FIGS. 3 and 5, the dovetail angle $\alpha$ is the angle between a side wall 28 and a line drawn normal to the inner wall 26 and through the intersection of the inner wall and the adjoining side wall 28. In other words, the angle $\alpha$ is the degree the side wall 28 inwardly departs from a 90° angle and forms an acute angle with the inner wall 26. A dovetail pocket configuration is preferred in the present invention because it provides increased locking ability of the insert 18 in the pocket 12 by the wedge 22. Further, the relative angle configuration of the body 11 and the pocket 12 can be formed to provide either a negative or positive cutting tool.

In forming each pocket 12, moreover, the side walls 28 can be formed by a single pass of a broaching tool (not shown) whether they are dovetailed or at a 90° angle with the inner wall 26 (e.g., $\alpha$ equals 0°). During formation, a vertical bore 31 can be provided at a corner between the inner wall 26 and a side wall 28 to provide relief from formation stresses, and a central groove 33 in the inner wall 26 can be provided for clearance of the metal removed by the insert 18 during the cutting operation.

The inserts 18 used in the present invention can be polygonal, circular or of any other peripheral shape which preferably includes a plurality of cutting edges. As shown in the exploded view of FIG. 2, the insert 18 is a cutting blade or wafer in the form of a square having parallel sides 32 and peripheral cutting edges 34 disposed substantially perpendicular to the sides 32.

The wedge 22 includes a base 36 at its outer end and a pair of flexible legs 38 at its inner end. The legs 38 are formed by a vertical slot 40 which extends through the wedge 22 along the longitudinal axis thereof from its inner end to the base 36 where the slot 40 terminates in a vertical bore 42 extending therethrough. As shown in FIG. 3, extending centrally through the wedge along the entire longitudinal axis thereof is a bore 44. The bore 44 includes an outer threaded portion 46 which extends through the base 36 and into the leg portion, an intermediate unthreaded segment 48 having a conical portion 50 with its reduced tapered spaced from the threaded portion 46, and an inner cylindrical portion 52 of reduced breadth or diameter extending from the tapered end of the conical portion 50 to the inner end of the wedge 22.

In the illustrative embodiment the taper of the conical portion is at an angle from about 15° to about 45° and preferably from about 20° to about 30°.

To flex the legs 38, there is provided a screw 54 and a ball 56 having a diameter less than the maximum diameter of the tapered or conical portion 50 and greater than the minimum diameter of the inner cylindrical portion 52 so that the ball 56 normally will be positioned in the tapered portion 50 (see FIG. 3). However, as the screw 54 is threaded into the bore 44 it drives the ball 56 into the reduced segment of the conical portion 50, thereby flexing the legs 38 laterally outwardly and apart from one another (see FIG. 4). Also, the head 53 of the screw 54 can be of the same diameter as the screw 54 so as to be able to be recessed in the bore 44. In such instance, the head 53 can include a recess 55 therein for a correspondingly configured wrench (not shown).

Normally, the legs 38 are unexpanded or unflexed, and the side walls 58 of the wedge 22 are preferably parallel, but in the flexed position the outwardly extending legs 38 form an obtuse angle relative to the base 36 to conform to the dovetail shape of the pocket. As will be more fully described hereinafter, when the wedge 22 is flexed, the insert 18 is locked against a side wall 28 of pocket 12 (FIG. 4), and when the wedge 22 is unflexed or unexpanded, the insert 18 can be indexed or replaced (FIG. 1). In moving from the flexed to the unflexed position, the described angle of the conical portion 50 facilitates movement of the expanding means or ball 56 and thereby inhibits the locking of the ball 56 in an undesired position.

Figure 2:
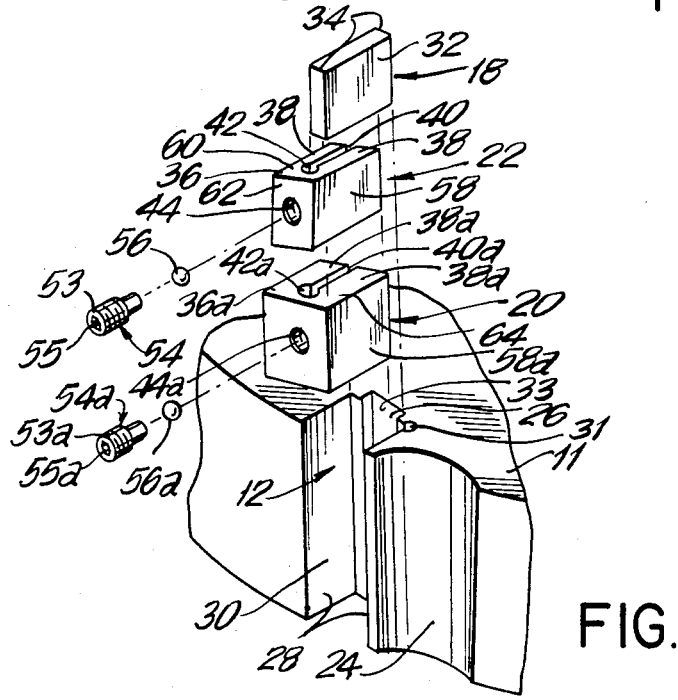
FIG. 2 is an exploded perspective view of the wedge and locator assembly of FIG. 1 together with a locator of the present invention for positioning the insert for cutting.

As shown in FIG. 3, the width of the unflexed wedge 22 is slightly less than the width or breadth defined by the insert 18 and the opposing side walls 28. This clearance fit allows easy ingress and egress into and from the pocket 12. To further facilitate the function of the wedge 22, its front and upper walls 60 and 62 are tapered or angled (e.g., 5° to 10°) away from the side wall 58 adapted to abut against the insert 18 (FIGS. 1-3).

With respect to the locator 20, its overall structure and operation is the same as the wedge 22, except that it is preferably generally rectangular in shape, has a greater breadth and is adapted to abut against both side walls 28 of the pocket 12 when expanded and locked therein. For convenience, we have assigned the same numbers to the comparable structure of the locator 20 followed by the letter "a". See FIGS. 5 and 6 for the details of the structure of the locator 20.

With respect to the breadth of the unexpanded or unflexed locator 20, it is slightly less than the width of the pocket 12 to facilitate insertion and removal (FIG. 5). However, in the flexed condition, the locator 20 is expanded to abut the side walls 28 of the pocket 12 and is locked therein (FIG. 6). In addition, the locator 20 includes a flat or planar upper surface 64 upon which the wedge 22 and the insert 18 can rest (FIG. 1).

In the illustrative embodiment the side walls 28 and 28a of the wedge 22 and locator 20 are parallel. It is to be understood that said walls 28 and 28a can be dovetailed, wherein the inner ends 37 and 37a of the wedge 22 and the locator 20 are wider than the outer ends 36 and 36a thereof, and wherein the slot or pocket 12 includes a dovetail angle $\alpha$ equal to or greater than the dovetail angle of the wedge 22 and locator 20 for locking thereof within the pocket 12. This embodiment of the invention can provide increased locking ability of the insert as well as the wedge and locator for use in high centrifugal force applications.

In practice, the locater 20 is placed in the pocket 12 in the unflexed condition with the legs 38a abutting the inner wall 26 and with the threaded portion 46 of the bore 44 facing outwardly. Also, the ball 56a is positioned in the conical portion 50a and the screw 54a is partially threaded into the locator 20. The locator 20 is vertically positioned in the pocket 12 so that when the insert 18 rests on its upper surface 64, it will be in the desired cutting position. To fix the locator 20 in position, the screw 54a is threaded further into the bore 44a by conventional means, such as by a hex wrench, whereupon the inner end of the screw 54a contacts and drives the ball 56a into the tapered end of the conical portion 50a. In doing so, the ball 56a flexes the legs 38a outwardly and against the side walls 28 of the pocket 12 to lock or secure the locator 20 in place.

The unflexed or unexpanded wedge 22 is placed in the pocket 12 and rests on the planar upper surface 64 of the locator 20 leaving a space along one side wall 28 of the pocket 12.

The wafer like insert 18 is inserted in the space with its bottom surface on the upper surface 64 of the locator 20, with its inner peripheral surface against the inner wall 26 of the pocket 12, with one of its sides 32 adjacent the side wall 28 and and with the other of its sides 32 adjacent the side wall 58 of the wedge 22.

The wedge assembly 22 is secured in place by threading the screw 54 into the wedge 22 which drives the ball 56 into the tapered end of the conical portion 50 thereby flexing the legs 38 outwardly against the insert 18 and the side wall 28, whereupon the insert 18 is locked against the other side wall 28 of the pocket 12.

When this assembly has been completed for each pocket 12, the milling cutter 10 is ready for operation.

When it is desired to index or replace an insert 18, the wedge 22 is unflexed by partially withdrawing the screw 54 from the bore 44. This action allows the ball 56 to return to a larger segment of the conical portion 50, whereupon the outwardly flexed legs 38 will move inwardly releasing the pressure on the insert 18. The insert 18 then can be indexed or replaced. Thereafter, the locking sequence for the wedge 22 is repeated and the insert 18 is again ready for cutting.

Similarly, when it is desired to adjust or replace the locator 20 or wedge 22, the described unlocking and locking procedure readily can be accomplished for each component.

The invention in its broader aspects is not limited to the specific described embodiment and departures may be made therefrom within the scope of the accompanying claims without departing from the principals of the invention and without sacrificing its chief advantages.

What is claimed:

1. A cutting tool, comprising:
    a body having at least one pocket therein in the form of an essentially vertical slot extending the length of said body and having an inner and opposing side walls and an outer opening coextensive with the length and breadth of said walls and wherein said side walls are dovetailed so as to be closer together at said outer opening than at said inner wall;
    an indexable cutting insert in said pocket and along one of said sidewalls, wherein said insert is in the form of a flat wafer having parallel sides and peripheral cutting edges essentially normal to said sides;
    an expandable wedge assembly normally having parallel sidewalls and a vertical slot therethrough extending the length of said wedge assembly to form a first pair of flexible legs for inserting into said pocket between said wafer and the other sidewall of said pocket and a first bore extending horizontally into said wedge having a first outer accessible threaded portion and an adjacent inwardly directed first tapered portion extending between said first pair of legs;
    an expandable locator for seating and positioning said indexable cutting insert, said locator having a second pair of flexible legs insertable in the pocket between the opposing walls of the pocket, an upper surface for seating the insert, and a second bore extending into said locator having a second outer threaded portion and an adjacent inwardly directed second tapered portion extending between said second pair of flexible legs;
    screw means in said first threaded portion of said first bore;
    expanding means in said first tapered portion of said first bore adapted to cooperate with said screw means to flex said first pair of legs laterally outwardly against a sidewall of said pocket and said insert as said screw means is threaded into said first bore for securing said insert against the other sidewall of the pocket, and to unflex said first pair of legs as said screw means is threaded from said first bore for releasing the insert for indexing or replacement;
    screw means in said second threaded portion of said second bore; and
    expanding means in said second tapered portion of said second bore adapted to cooperate with said screw means to flex said second pair of legs laterally outwardly against the opposing walls of the pocket as said screw means is threaded into said second bore for securing said locator within the pocket, and to unflex said second pair of legs as said screw means is threaded from said second bore for releasing and adjusting said locator.

2. The cutting tool of claim 1, wherein said body is an annular face milling cutter including a plurality of said pockets about its outer periphery, and wherein said inserts, said expandable wedge assemblies and said expandable locators are adapted to be positioned in each of said pockets.

3. The cutting tool of claim 1, wherein a dovetail angle between the sidewalls of said pocket and a line drawn normal to the inner wall and through the intersection of the inner wall and the adjoining sidewall is formed to about 0° to about 3.0°.

4. In combination with a cutting tool comprising a body having at least one pocket therein in the form of an essentially vertical slot extending the length of the body and having an inner and substantially parallel opposing sidewalls and an outer opening coextensive with the length and breadth of the sidewalls, an indexable cutting insert in the pocket and along one of the sidewalls, wherein said insert is in the form of a flat wafer having parallel sides and peripheral cutting edges and means to secure said insert in said pocket, the improvement which comprises:
    an expandable wedge assembly for releasably securing said insert in the pocket, said wedge normally having parallel sidewalls and a vertical slot therethrough extending the length of said wedge assembly to form a first pair of flexible legs for inserting into said pocket between said wafer insert and the other sidewall of said pocket and a first bore extending horizontally into said wedge having a first outer accessible threaded portion and an adjacent inwardly directed first tapered portion extending between said first pair of legs;

an expandable locator for seating and positioning said indexable cutting insert, said locator having a second pair of flexible legs insertable in the pocket between the opposing sidewalls of the pocket, an upper surface for seating the insert, and a second bore extending into said locator having a second outer threaded portion and an adjacent inwardly directed second tapered portion extending between said second pair of legs;

screw means in said first threaded portion of said first bore;

expanding means in said first tapered portion of said first bore adapted to cooperate with said screw means to flex said first pair of legs laterally outwardly against a sidewall of said pocket and said insert as said screw means is threaded into said first bore for securing said insert against the other sidewall of the pocket, and to unflex said first pair of legs as said screw means is threaded from said first bore for releasing the insert for indexing or replacement;

screw means in said second threaded portion of said second bore; and expanding means in said second tapered portion of said second bore adapted to cooperate with said screw means to flex said second pair of legs laterally outwardly against the opposing walls of the pocket as said screw means is threaded into said second bore for securing said locator within the pocket, and to unflex said second pair of legs as said screw means is threaded from said second bore for releasing and adjusting said locator.

5. The cutting tool of claim 4, wherein said body is an annular face milling cutter including a plurality of said pockets about its outer periphery, and wherein said inserts, said expandable wedge assemblies and said expandable locators are adapted to be positioned in each of said pockets.

6. The cutting tool of claim 4, wherein a dovetail angle between the sidewalls of said pocket and a line drawn normal to the inner wall and through the intersection of the inner wall and the adjoining sidewall is formed to about 0° to about 3.0°.

* * * * *